United States Patent [19]

Durant et al.

[11] Patent Number: 5,078,872
[45] Date of Patent: Jan. 7, 1992

[54] COMBINED STRAINER AND POUR SPOUT APPARATUS

[76] Inventors: Will G. Durant, 248 Quincy, Long Beach, Calif. 90803; Erin M. Durant, 838 East Washington Ave., Orange, Calif. 92666

[21] Appl. No.: 574,477

[22] Filed: Aug. 27, 1990

Related U.S. Application Data

[63] Continuation of Ser. No. 374,455, Jun. 30, 1989, abandoned.

[51] Int. Cl.$^5$ .............................................. B01D 24/38
[52] U.S. Cl. .................................... 210/232; 210/466; 210/477; 210/505; 222/189; 222/569; 222/574; 493/941
[58] Field of Search ............... 210/232, 466, 469, 474, 210/497.2, 505, 473, 475, 477, 479; 222/189 X, 567 X, 567 R, 570 X, 570 R, 569 X, 572, 574; 493/941

[56] References Cited

U.S. PATENT DOCUMENTS

| 752,019 | 2/1904 | Adwen | 210/474 |
|---|---|---|---|
| 954,129 | 11/1909 | Newlove | 210/474 |
| 1,732,130 | 10/1929 | Lindahl | 222/569 |
| 2,849,158 | 8/1958 | Hopla | 210/466 |
| 3,081,912 | 3/1963 | Goceliak | 210/474 |
| 3,567,033 | 3/1971 | Whelan | 210/497.2 |
| 3,738,889 | 6/1973 | Whelan | 210/497.2 |
| 3,741,397 | 6/1973 | Gerson et al. | 210/497.2 |
| 4,294,701 | 10/1981 | Whelan | 210/497.2 |
| 4,362,624 | 12/1982 | Ueda | 210/497.2 |
| 4,559,140 | 12/1985 | Croteau | 210/497.2 |
| 4,804,470 | 2/1989 | Calvillo et al. | 210/232 |
| 4,813,579 | 3/1989 | Ciumaga | 222/570 |
| 4,946,591 | 8/1990 | Mealey | 210/497.2 |

FOREIGN PATENT DOCUMENTS

| 32865 | 5/1911 | Sweden | 210/469 |
|---|---|---|---|
| 1591035 | 6/1981 | United Kingdom | 210/497.2 |

*Primary Examiner*—Robert A. Dawson
*Assistant Examiner*—Joseph Drodge
*Attorney, Agent, or Firm*—Leonard Tachner

[57] ABSTRACT

A disposable, combined strainer and pour spout integrates into one apparatus the combination of means for pouring and straining utilizing a simple device that may be readily attached to or integrated with a disposable bucket or tub for holding paints or other liquids. A pour spout member of the invention is preferably made of a simple die cut paper shape and a strainer member of the present invention is preferably a die cut triangular mesh to which a paper band is affixed at one edge. The strainer mesh is secured to the pour spout by stitching, or gluing along two sides. The band side of the strainer mesh is left free to move away from the spout as the device is rolled into a partial cylindrical or conical section when attached to the bucket. The combined assembly may be attached to a disposable bucket utilizing a pre-applied tape band, stitching, or may be built integrally into the bucket.

10 Claims, 3 Drawing Sheets

COMBINED STRAINER AND POUR SPOUT APPARATUS

This is a continuation of application Ser. No. 07/374,455, filed June 30, 1989 and now abandoned.

BACKGROUND OF THE INVENTION

1. Field of the Invention

The present invention relates generally to an apparatus for both straining and pouring liquids and more specifically to a combined strainer and pour spout apparatus which provides for concurrent filtering and pouring of a liquid from an attached or integral container and which finds particularly advantageous use in the handling of paints.

2. Prior Art

The need to strain or filter paints and other liquids in order to enable their use in critical applications including spraying, coating and the like has long been known. Furthermore, it has also been known that because of the contaminating characteristic of paint or similar liquids, it is highly desireable that straining and mixing receptacles be made of paper or other inexpensive material so that they can be made economically disposable. A process for straining or filtering is virtually mandatory for use in paint spraying applications because paint spraying equipment utilizes small orifices to atomize the paint and any agglomerations of dried paint could readily block such orifices and thus severely inhibit or entirely disable the paint spraying process. Normally the straining or filtering process must be carried out only after blending, thinning or combining has been accomplished. In this way, any particulates involved in the processes will be strained and filtered out. The conventional methods used to perform straining and subsequent transfer of liquids to the spraying receptacle or similar in-use container typically involve two elements. More specifically, the basic material is usually first poured into a mixer container. The liquid is then stirred, cut with reducers, tinted and the like, and where epoxy materials are involved, a catalyst is added at this point. Once properly mixed, the liquid is poured from the mouth of the mixing container into a conical or similar shaped strainer which is placed just above or into juxtaposition with the entry orifice of the spray gun receptacle. The liquid then drains into the receptacle, passing through a mesh screen which is designed to trap particulates and thereby prevent such particulates from entering the spray gun cup.

Unfortunately, the above described conventional process has several inherent disadvantages. By way of example, two and sometimes three separate devices are required including a mixing tub, a strainer and a strainer holder. Typically, the tub and strainer are disposed of after use. The mixing bucket must be of sufficient size to mix a batch of material, while the strainer must be small enough to fit into or just above the spray gun cup. This disparity in size requirements makes the possibility of spillage that much higher. Also, it frequently necessitates the use of more than one strainer for each spraying job. Once the liquid is poured into the strainer, it may not be retrieved, but must be allowed to continue to pass through the strainer. This often results in imprecise level control, overflow and spillage due to removal of the strainer while it is still partially full and draining. Furthermore, it is quite time-consuming to wait for all the material to fully pass through the strainer. The contaminants or particulates commonly found in paint, quickly plug the strainer screen, thereby greatly slowing the process of draining. Furthermore, because a cone strainer cannot be inverted, the particulates have no way to "backflush" from the screen thereby quickly rendering the strainer useless. Furthermore, the cross-sectional area of the mesh is usually quite limited because of the nature of the conical design of the strainer and the mesh being built in to the small end of the cone. Frequently, unless a holding device is employed, the cone strainer is placed directly into the spray gun cup, thus blocking vision into the cup. This results in an increased possibility of overfill and spillage. If a holding device is used above the gun, drippage results once the gun is removed unless excess time is spent allowing the cone strainer to drain fully.

Although there have been a number of attempted solutions to overcome the aforementioned deficiencies of the prior art, unfortunately, none has been satisfactory. By way of example:

U.S. Pat. No. 954,129 to Newlove is directed to a milking pail having a spout adapted to serve as a discharge for the milk. The pail includes a spout, the distal end of which is adapted to receive a plate having an opening over which extends a piece of wire netting of small mesh size. However, the spout is not removable nor a disposable element.

U.S. Pat. No. 752,019 to Adwen is directed to a disposable strainer for liquids such as paint. As shown in the Figures, the straining sheet "C" is glued between two mating faces of the sections "A" and "B" which are formed into a conical cup to form a funnel-like strainer. However, the cup-shaped strainer does not have an imperforate side.

U.S. Pat. No. 4,559,140 to Croteau is directed to a paint filter. The paint filter is formed in a conical cup shape, or cone, from stiff sheet material. The cone is formed with apertures which are covered by a filtration mesh screen secured to a blank from which the cone is formed.

U.S. Pat. No. 4,362,624 to Ueda is directed to a strainer for paints utilizing a double filter concept. The strainer is formed by a funnel-shaped main body and an inner filter plate adapted to be folded into the main body for use. The main body is formed with three openings over which a filter cloth is adhesively coupled. Similarly, the filter plate includes a filter cloth adhesively coupled over a notch formed therein.

U.S. Pat. No. 4,804,470 to Calvillo et al is directed to a paint strainer which may be formed as a disposable unit. The paint strainer is defined by a plurality of planar side walls joined together to form a substantially square cross-sectioned prism defining an upper opening surrounded by a continuous upper edge. A mesh strainer bag is coupled to and extends from the upper edge of the paint strainer and assumes a tapered shape under the weight of accumulating paint.

There is therefore a continuing long felt need for an inexpensive and thus disposable device which provides the ability for simultaneously straining and transferring liquids in such a manner as to overcome the aforementioned deficiencies of the prior art.

SUMMARY OF THE INVENTION

The disposable combined strainer and pour spout of the present invention integrates into one apparatus the combination of means for mixing, pouring and straining utilizing a simple device that may be readily attached or integrated with a bucket or tub for holding paints or other liquids. A pour spout member of the invention is preferably made of a simple die cut paper shape and a strainer member of the present invention is preferably a die cut mesh shape to which a paper band is affixed at one edge. The strainer mesh is secured to the pour spout by stitching, or gluing along two sides. The band side of the strainer mesh is left free to move away from the spout as the device is rolled into a partial cylindrical section when attached to the bucket. The combined assembly may be attached to a disposable bucket utilizing a pre-applied tape band, stitching, or may be built integrally into the bucket or built integrally into a paper pour spout as described under U.S. U.S. Pat. No. 4,736,874 to Durant, a co-inventor of the invention described herein.

Because both elements of the invention described herein are flat in structure, they may always be folded against each other prior to use when pre-assembled with or integral with the bucket. Such buckets, if tapered, may still be nested in the usual manner without difficulty of obstruction. Prior to use, the strainer mesh is simply opened away from the pour spout section forming a hollow-shaped pouring channel enclosed at the outer sides and discharge end by the mesh. Locking tabs, built into the spout section, hook into slits in the band section of the strainer mesh or may be permanently adhered thereto. The locking tabs simultaneously serve to support the arched entry portion of the strainer mesh and support the channel sideboards of the spout section.

As liquid is dispensed from the bucket, it is simultaneously strained and directed into a precise channel that is narrower than can be achieved by pouring directly from the large circular opening of the bucket. In such cases where the assembly is supplied separately from the bucket as disclosed herein in the attached drawings, it is provided with a preapplied "peel-off", or gummed tape band affixed to the lower outer portion of the pour spout. The user may easily tape the device to the paper bucket. The tape employed, preferably utilizes an adhesive that is not affected by solvents commonly encountered in the process of mixing or pouring paints and other liquids.

The present invention offers several distinct advantages over existing devices and methods for dispensing and straining paints and similar liquids. More specifically, the entire process of mixing, pouring and straining by using the present invention involves only one disposable device. The process of pouring and straining is simultaneous rather than progressive or sequential. The process of pouring and straining using the present invention may be easily stopped at any point precisely and without spillage, drippage or mess. Pouring is directed and controlled and vision is not blocked to the receiving receptacle. Backflushing of the mesh is automatic when pouring is stopped and liquid backflows into the bucket, carrying with it the particulates which would otherwise clog the mesh. In a best mode of the present invention, the device is made of paper and cloth or synthetic mesh, thus making it economical as an intended disposable device. Nesting of pails or buckets using the present invention is not inhibited. A channeled and directed pour stream is achieved and no size differential problem occurs between bucket and strainer. Furthermore, the total mesh area attainable by using the present invention is generally larger than is attainable by using conventional methods and devices of the prior art.

OBJECTS OF THE INVENTION

It is therefore a principal object of the present invention to provide a disposable combined strainer and pour spout that may be readily attached to or integrated into a container for paint or other liquids for simultaneously pouring and straining such liquids.

It is an additional object of the present invention to provide a combined strainer and pour spout made of relatively inexpensive materials thereby rendering the combined strainer and pour spout sufficiently economical to be readily disposable.

It is still an additional object of the present invention to provide a combined strainer and pour spout utilizing elements which may be flattened in structure and thus folded against each other prior to use, whereby when preassembled with or made integral to a bucket or other container, permitting such containers to be nested in the usual manner without difficulty or obstruction.

It is still and additional object of the present invention to provide a combined strainer and pour spout apparatus which, in a preferred embodiment, is made of paper and a cloth or synthetic mesh and which may be provided with a pre-applied tape band for adhesively connecting the combined strainer and pour spout apparatus to a paper bucket or tub for enabling the mixing, pouring and straining of liquids such as paint, while utilizing one integrated disposable device.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
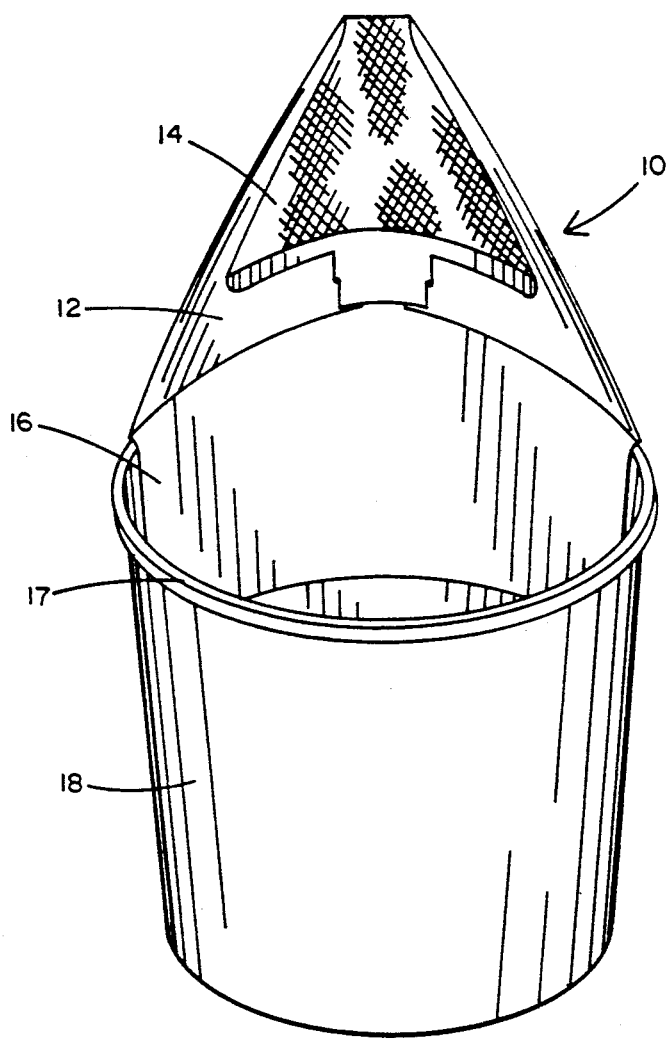
FIG. 1 is an isometric view of the present invention shown attached to a conventional paper bucket.

Referring now to FIG. 1, it will be seen that the combined strainer and pour spout 10 of the present invention comprises a spout member 12 and a strainer member 14. The spout member 12 is provided with an interface portion 16 which, as will be hereinafter more fully explained, is designed to interface with a liquid-holding container such as a tub, pail or bucket 18. The combined strainer and pour spout 10 extends above an upper lip 17 of the container 18. In this manner when the container 18 is tilted in the direction of the combined strainer and pour spout 10, liquid contained within the tub or pail is directed along the surface of spout member 12 where it must pass through strainer member 14 and be filtered thereby, thus preventing the escape from the bucket 18 of any dried paint or other particulate material that may be contained and mixed within the liquid in bucket 18.

Figure 2:
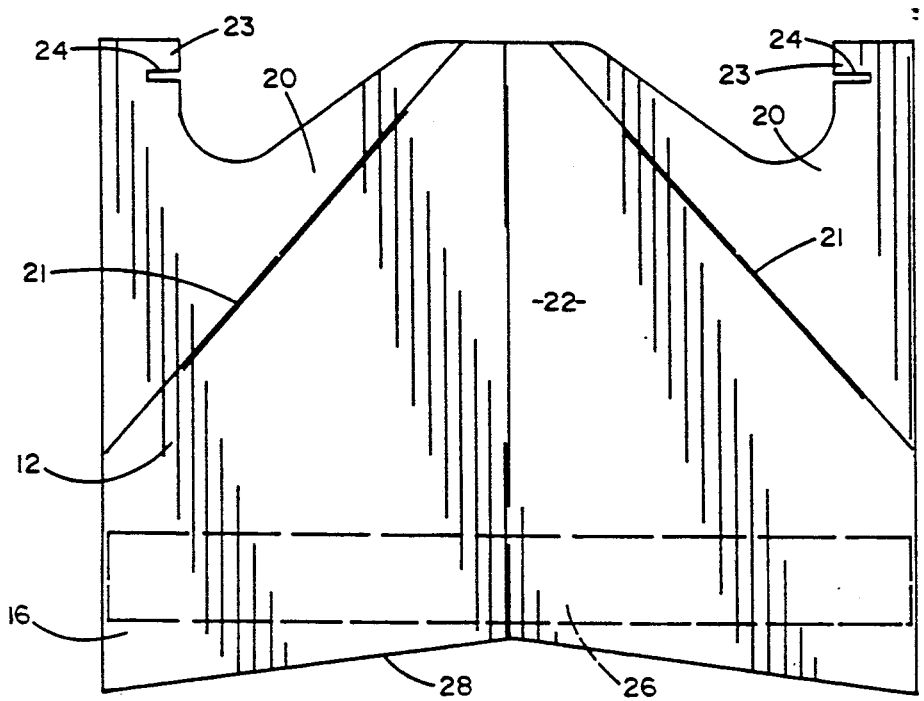
FIG. 2 is a plan view of the spout member of the present invention.

The detailed structure of combined strainer and pour spout 10 may be best understood by reference to FIGS. 2 through 4 which will now be described. More specifically as seen in FIG. 2, spout member 12 is of a generally rectangular flat shape, the upper corners of which are contoured to provide a pair of foldable leafs 20, foldable about corresponding fold lines 21 toward a pouring surface 22. The upper-most outer corner of each foldable leaf 20 is provided with a tab 23 immediately adjacent a slot or notch 24.

Immediately below the pouring surface 22 there is provided the interface portion 16 which, as shown in FIG. 1, is adapted to rest against and be contiguous with the interior surface of tub or pail 18 for positioning the combined strainer and pour spout 10 immediately above the container lip 17. Although there are many methods available for securing an attachment between interface portions 16 and the interior surface of tub 18, in a preferred embodiment of the present invention shown herein, interface portion 16 is provided with a tape band 26 which preferably uses a "peel-off" tape which may be readily deployed for allowing the user to easily tape the combined strainer and pour spout 10 to the paper bucket. Tape band 26 should preferably use an adhesive that is not affected by solvents or other liquids likely to be encountered in the use intended for the present invention. The bottom edge of interface portion 16 of spout member 12 is preferably tapered in a symmetrical fashion as shown in FIG. 2 and generally designated by reference number 28.

Figure 3:
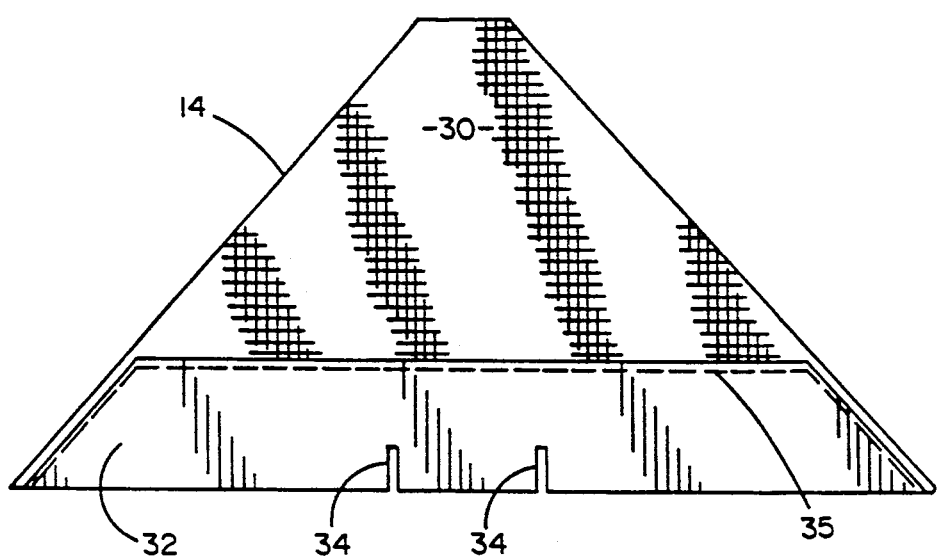
FIG. 3 is a plan view of the strainer member of the present invention.

As seen in FIG. 3, strainer member 14 comprises a screen mesh material 30 which is of a truncated triangular shape, the lower border region of which is attached to a contour band 32 preferably made of the same paper material as spout member 12. The screen mesh 30 may be readily attached to the contour band 32 by means of stitching 35. Contour band 32 is provided with a pair of spaced slots or notches 34 positioned symmetrically on either side of the vertical center line of mesh 30. As shown in FIG. 4, the combined screen mesh 30 and contour band 32 of strainer member 14, are of the appropriate size and shape for substantial congruence with the pouring surface 22 of spout member 12. Furthermore, it will also be seen in FIG. 4 that the strainer member 14 may be attached to the spout member 12 by stitching 36 along the top and side edges of strainer member 14, the side edges being substantially co-linear with the fold lines 21 of spout member 12.

Figure 4:
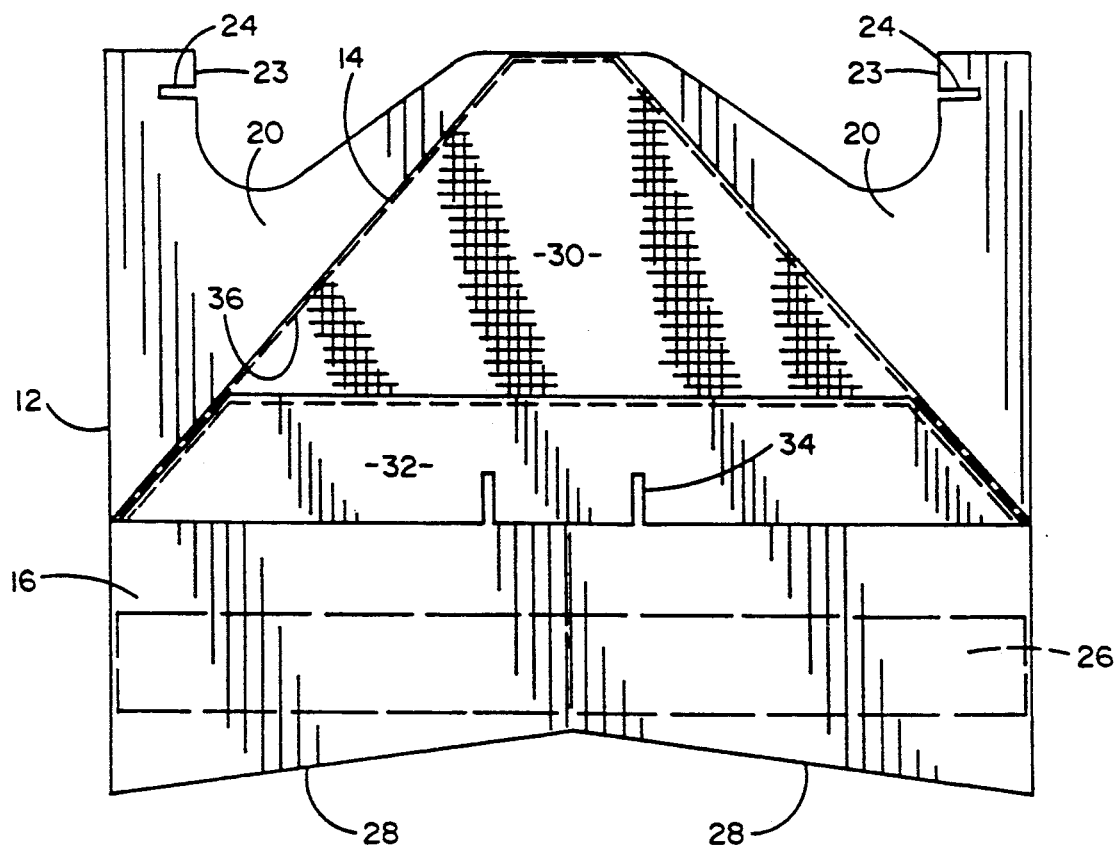
FIG. 4 is a plan view of the integrated spout member and strainer member of the present invention shown in their flat and unfolded configuration.
Figure 5:
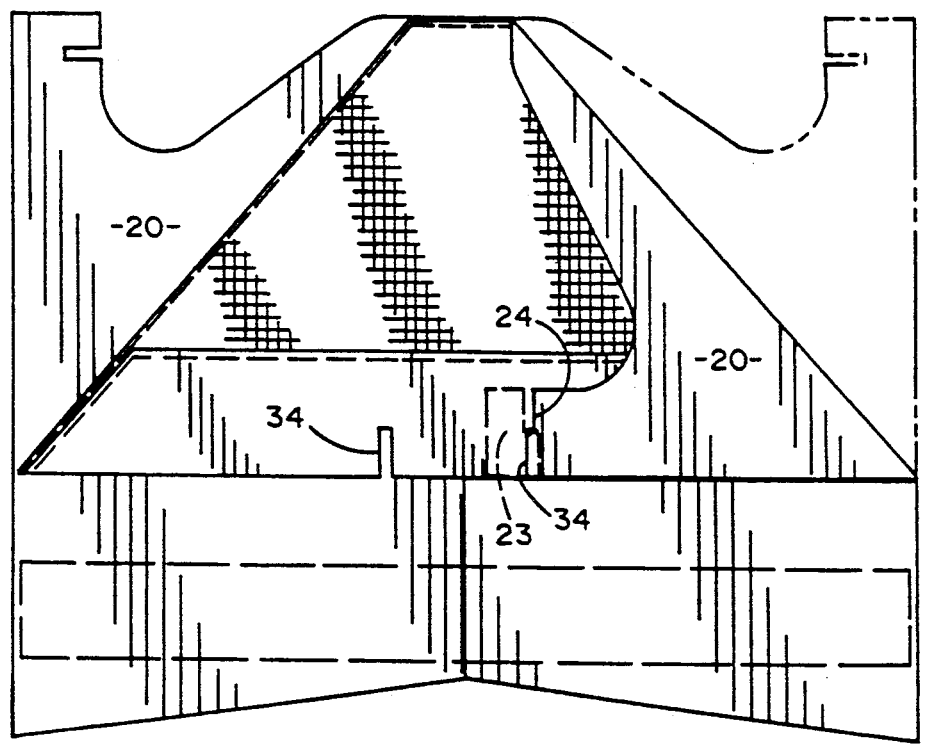
FIG. 5 is a view of the combined strainer and pour spout of the present invention similar to that of FIG. 4, but shown in a partially folded configuration.
Figure 6:
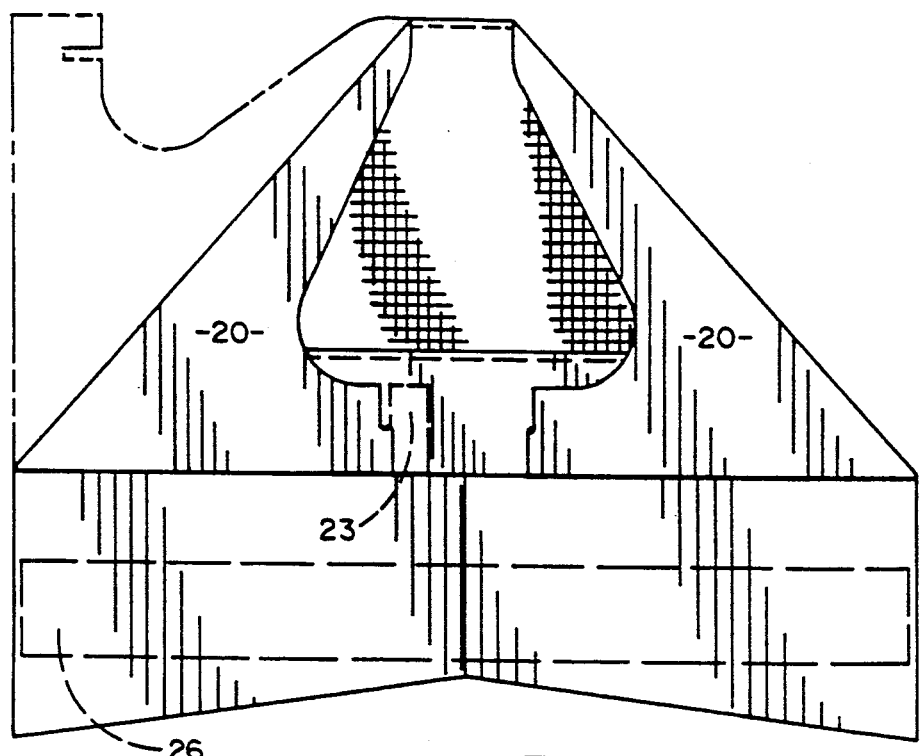
FIG. 6 is a plan view of the combined strainer and pour spout of the present invention similar to that of FIGS. 4 and 5, but shown in its fully folded configuration ready for attachment to a paper bucket of the type shown in FIG. 1.

It will be understood that each of FIGS. 2, 3 and 4 illustrates the spout member 12, strainer member 14 and the combination of the two in a flat configuration which is suitable for packaging, storage and the like. However, when the combined strainer and pour spout 10 of the present invention is configured for pouring in the manner shown in FIG. 1, the mesh 30 is made to extend away from the pouring surface 22 so that liquids poured from the container 18 of FIG. 1 will pass through the mesh 30 before leaving the pouring surface 22. This extension of the mesh 30 from the pouring surface 22 is accomplished by a simple folding and attachment process illustrated in FIGS. 5 and 6. More specifically, as shown in FIG. 5, first one leaf 20 of spout member 12 is folded about fold line 21 until the slot or notch 24 of the spout member is mated with the corresponding slot or notch 34 of the strainer member 14 with the tab 23 being positioned behind the contour band 32 as seen in FIG. 5. In FIG. 5 the right-most foldable leaf 20 is shown in solid line in its folded configuration and in phantom line in its unfolded configuration. FIG. 6 illustrates the same type of folding operation for the left-most folding leaf 20, again mating slot or notch 24 of the foldable leaf 20 with the slot or notch 34 of the contour band 32, positioning the tab 23 behind the contour band.

It will be understood that because of the curvature imparted to the combined strainer and pour spout 10 required to provide the contiguous engagement between the interface portion 16 of the spout member 12 and the interior surface of tub 18 of FIG. 1, the folded interconnection between the foldable leafs 20 and the contour band 32 of strainer member 14, will pull the mesh 30 away from the pouring surface 22. As viewed in FIG. 6, the pouring surface 22 will be of concave shape and the foldable leaf 20 and mesh 30 will be of convex shape. Consequently, all liquid poured from tub 18 of FIG. 1 in the direction of the combined strainer and pour spout 10, will pass between the pouring surface 22 and the mesh 30 and eventually through the mesh 30 before it leaves the pouring surface 22.

Thus, by simply folding the combined strainer and pour spout 10 in the manner depicted in FIGS. 5 and 6, the mesh 30 is opened away from the pour spout forming a oval-shaped pouring channel enclosed at the outer sides and the discharge end by the mesh 30. This configuration is secured by the locking tabs 23 which hook into the slots or notches 34 in the contour band. The locking tabs 23 simultaneously serve to support the arched entry portion of the mesh 30 and support the channel sideboards of the spout section. The locking tabs may also be glued together and to the band at the time of manufacture. As liquid is dispensed from the bucket 18 it is simultaneously strained and directed into a precise narrow stream whereby mixing, pouring and straining may be accomplished in one readily disposable device.

Because of the invention's unique configuration, the process of pouring and straining is carried out simultaneously rather than sequentially as is done in the prior art previously described. Furthermore, the process of pouring may be easily stopped at any point precisely without spillage or drippage. Pouring is directed and controlled and vision of the receiving receptacle is not blocked. Backflushing of the mesh is automatic when pouring is stopped and liquid backflows into the bucket carrying with it the particulates which would otherwise clog the mesh. Because of the folding configuration of the invention, the combined strainer and pour spout may be initially provided in a flat configuration which would not inhibit the nesting of buckets in a conventional manner. In the event that the combined strainer and pour spout 10 were provided as an integral portion of the bucket, the requirement for adhering the interface portion in the manner previously described would be avoided.

It will now be understood that what has been disclosed herein comprises a novel, disposable, combined strainer and pour spout having two interconnected members, namely, a strainer member and a pour spout member. The pour spout member is a simple die cut paper shape. The strainer member is a die cut mesh triangle to which a paper band is affixed at one edge. The strainer member is secured to the pour spout member by stitching or gluing along two sides. The band side of the strainer member is not secured, but left free to move away from the spout as the device is rolled into a partial cylindrical section when attached to the bucket by means of a tape band provided along an interface portion.

Those having skill in the art to which the present invention pertains will now, as a result of the applicants' teaching herein, perceive various modifications and additions which may be made to the invention. By way of example, the precise size and shape of the spout member, the strainer member and the screen mesh, may be readily altered without deviating from the general concept of the invention. Furthermore, the method for integrating the combined strainer and pour spout of the invention into a bucket, may be readily altered. The method for securing the spout member and strainer member to one another, as well as securing them in their folded configuration, may be readily altered. Furthermore, it will be understood that the precise mesh size of the screen mesh provided herein may be altered to accommodate variations in the filtering and pouring efficiency of the device. Accordingly, all such modifications and additions are deemed to be within the scope of the invention which is to be limited only by the claims appended hereto.

We claim:

1. A combined strainer and pour spout apparatus constructed and arranged for attachment to a container of a liquid having an internal sidewall surface for simultaneous pouring and straining of the liquid from the container; the apparatus comprising:
   a spout member having adhesive attachment means for releaseable securement to said internal sidewall surface of said container, said spout member having a pouring surface and an interface surface in substantially continuous interface with at least a portion of a segment of said container internal sidewall surface;
   a strainer member having a screen mesh connected to said spout member adjacent said pouring surface;
   said spout and strainer members being foldable and interconnected to one another for forming a mesh enclosed channel for said liquid whereby pouring and straining of said liquid occurs simultaneously.

2. The apparatus recited in claim 1 wherein said spout member is made of paper.

3. The apparatus recited in claim 1 wherein said adhesive attachment means comprises an adhesive-coated type.

4. The apparatus recited in claim 1 wherein said strainer member further comprises a contour band attached to said screen mesh, said contour band forming an opening to said mesh-enclosed channel.

5. The apparatus recited in claim 4 wherein said spout member includes foldable leafs, and means for interconnecting said leafs and said contour band for retaining said channel in an open configuration.

6. The apparatus recited in claim 5 wherein said means for interconnecting said leafs and said contour band includes a notch and a locking tab on each of said foldable leafs and notches on said contour band.

7. The apparatus recited in claim 4 wherein said contour band is made of paper.

8. A foldable, combined strainer and pour spout apparatus constructed and arranged for simultaneously pouring and filtering liquids from a container having an internal sidewall surface; the apparatus comprising:
   a spout member having means for releasable attachment to said container internal sidewall surface throughout at least a portion of a segment of said container internal sidewall surface;
   a strainer member; and
   means for interconnecting said spout member and said strainer member for forming a channel therebetween when in a first position and for compressing said spout member and strainer member into flat contiguous surfaces when in a second position, said spout member having a pair of transversely displaced leaf portions respectively having a first pair of notches formed therein for insert into a second pair of notches formed in said strainer member.

9. The apparatus recited in claim 8 wherein said spout member is made of paper and wherein said strainer member is made of paper and screen mesh material.

10. The apparatus as recited in claim 8 wherein said means for interconnecting said spout member and said strainer member includes stitching along all but one side of said strainer member and interconnectable notches on said spout member and said strainer member.

* * * * *